United States Patent [19]

Huber et al.

[11] Patent Number: 4,903,161
[45] Date of Patent: Feb. 20, 1990

[54] SURGE SUPPRESSION FOR LOW VOLTAGE SIGNAL CIRCUITS

[75] Inventors: Paul G. Huber, West Warwick; John J. Gizienski, Coventry, both of R.I.; Edward B. Miller, Avon, Conn.; Joseph P. Stefani, Warwick; Dewey L. Harris, Coventry, both of R.I.

[73] Assignee: General Electric Company, Schenectady, N.Y.

[21] Appl. No.: 145,081

[22] Filed: Jan. 19, 1988

Related U.S. Application Data

[63] Continuation-in-part of Ser. No. 942,483, Dec. 15, 1986, Pat. No. 4,739,436.

[51] Int. Cl.$^4$ ............................................. H02H 3/20
[52] U.S. Cl. ........................................ 361/56; 361/91; 361/111; 361/103; 361/120
[58] Field of Search ...................... 361/56, 86, 91, 111, 361/103, 117–119, 120

[56] References Cited

U.S. PATENT DOCUMENTS

| | | | |
|---|---|---|---|
| 4,089,032 | 5/1978 | Dell Orfano | 361/56 |
| 4,345,290 | 8/1982 | Johnson | 361/91 X |
| 4,438,477 | 3/1984 | Cawley | 361/56 |
| 4,554,608 | 11/1985 | Block | 361/120 X |
| 4,587,588 | 5/1986 | Goldstein | 361/56 |
| 4,633,359 | 12/1986 | Mickelson et al. | 361/120 X |
| 4,649,457 | 3/1987 | Talbot et al. | 361/127 |
| 4,661,878 | 4/1987 | Brown | 361/111 X |
| 4,723,190 | 2/1988 | Chang | 361/91 |
| 4,729,055 | 3/1988 | Dorival et al. | 361/120 X |
| 4,739,436 | 4/1988 | Stefani et al. | 361/91 X |
| 4,758,920 | 7/1988 | McCartney | 361/119 |

*Primary Examiner*—Derek S. Jennings
*Attorney, Agent, or Firm*—Edward M. Corcoran; Stanley C. Corwin; Fred Jacob

[57] ABSTRACT

A voltage surge suppression circuit for a low voltage coaxial cable comprises a gas tube connected across the signal and shield conductors and an MOV connecting the shield conductor to a ground. In the case of a balance signal line comprising two conductors, a first gas tube connects one line to ground and a second gas tube is connected across both conductors. A third gas tube may connect the other conductor to ground in which case the second gas tube may be optional. The ground is preferably a ground associated with a power line voltage surge suppression means.

19 Claims, 4 Drawing Sheets

SURGE SUPPRESSION FOR LOW VOLTAGE SIGNAL CIRCUITS

CROSS-REFERENCE TO RELATED APPLICATION

This application is a continuation-in-part application of copending U.S. Ser. No. 942,483 filed on Dec. 15, 1986, now U.S. Pat. No. 4,739,436.

BACKGROUND OF THE INVENTION

1. Field of the Invention

This invention relates to transient voltage surge suppression for low-voltage signal circuits. More particularly, this invention relates to protecting low-voltage signal circuits which receive data or signals from an unbalanced coaxial cable from transient voltage surges by means of a circuit comprising a gas tube connected across the shield and signal conductors of the cable in combination with a metal oxide varistor connecting the shield conductor to ground. In another embodiment wherein the data signal is received from a twin lead balanced line, a first gas tube will be connected across both leads, a second gas tube will connect one of the signal leads to ground and a third gas tube will connect the other signal lead to ground.

2. Background of the Disclosure

It has been determined that transient voltage surge suppressors are needed to protect consumer electronic equipment now commonly found in many households. It is also necessary to provide protection from transient voltage surges for low-voltage data circuits, such as those found on line-powered products that use an antenna or other line connection. Such antenna line connections include an unbalanced line such as a coaxial cable which provides low-voltage data signals to VCR's, television sets, home computers, telephonic electronic equipment, etc., as well as with balanced lines such as the common 300 ohm flat twin lead antenna wire employed with television sets. Low-voltage data receiving and processing circuits and associated equipment are extremely susceptible to damage and destruction by very short duration transient voltage spikes. A characterization of these spikes is provided by the Institute of Electrical and Electronic Engineers, IEEE Standard 587-1980. This document is publicly available and describes voltage surges with durations of typically about 28 microseconds, peak voltages of about 6000 volts and peak follow currents of about 3000 amperes. Even though such surges are generally of short duration, a cumulative effect will cause failure of the electronic components in the data receiving circuit.

Figure 1A:
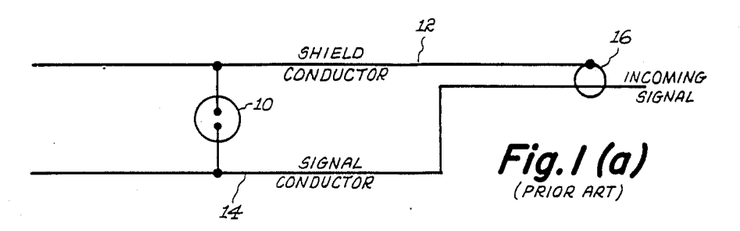
FIG. 1(a) is a schematic circuit diagram illustrating conventional low-voltage signal or data circuit suppression means employed with an unbalanced data line such as a coaxial cable.
Figure 1B:
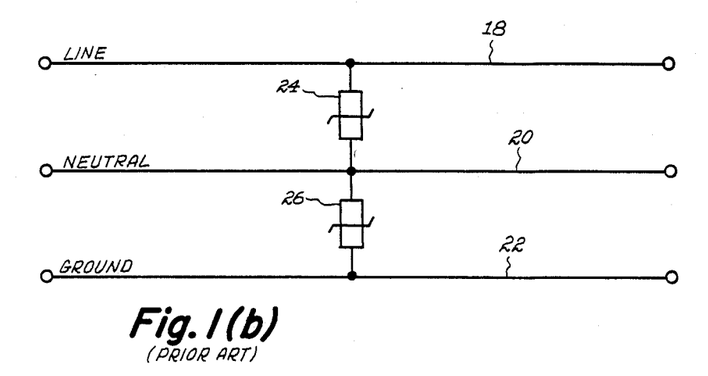
FIG. 1(b) is a schematic circuit diagram illustrating a conventional type of line or power transient voltage surge suppression circuitry.

Present ways of accomplishing transient voltage surge suppression for low voltage data circuits include a gas tube connected across the shield and signal conductors of a signal containing coaxial cable as is shown schematically in FIG. 1(a). Thus, gas tube 10 is connected across shield conductor 12 and data signal conductor 14 of coaxial cable 16. Moreover, the gas tube 10 connected across the data signal line is used in conjunction with a power surge suppression circuit such as that schematically shown in FIG. 1(b). The transient power voltage surge suppression circuit shown in FIG. 1(b) is a conventional type employed with a common household outlet having 3 conductors: line 18, neutral 20 and ground 22. The power voltage surge suppression circuit comprises a first metal oxide varistor (MOV) 24 connected across line 18 and neutral 20 and a second MOV 26 connected across neutral 20 and ground 22. Power surges may be generated from line to neutral, line to ground or neutral to ground.

Figure 1C:
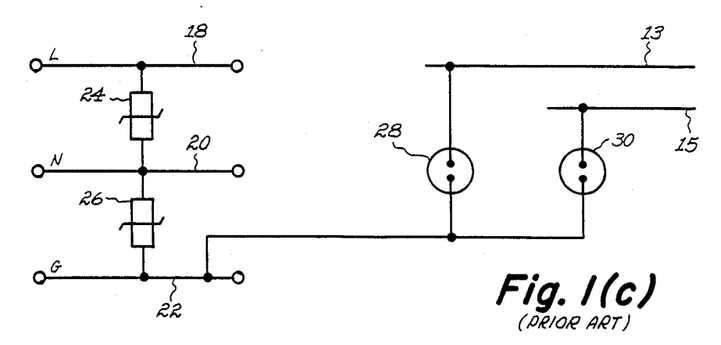
FIG. 1(c) is a schematic circuit diagram illustrating another known circuit for protecting low-voltage data circuitry where the data signal is supplied via a balanced line, in combination with a conventional power source transient voltage surge protection circuit.

Another method of transient voltage surge suppression is the type generally employed with telephone line data connections schematically shown in FIG. 1(c). In this circuit, separate gas tubes 28 and 30 independently connect conductors 13 and 15, respectively, to the ground line 22 of a power surge suppressor such as the type discussed above which comprises two MOV's 24 and 26 which separately connect the line 18 and ground 22 conductors to neutral conductor 20.

SUMMARY OF THE INVENTION

The present invention relates to protecting low-voltage signal or data circuits and associated equipment from transient voltage surges. In one embodiment the signals are received from an unbalanced line, such as a coaxial cable having a shield and a data signal conductor, and the transient voltage surge protection circuit comprises a gas tube connected across the shield and signal conductors of the cable in combination with an MOV connecting the shield conductor to ground. In another embodiment wherein the data signal is provided with a balanced line condition, such as occurs with the common 300 ohm, flat, twin lead TV antenna line, the MOV will be replaced with a gas tube and another gas tube may connect the other conductor to ground. Thus, in this embodiment a first gas tube will be connected across both leads, a second gas tube will connect one of the two signal leads to ground and a third gas tube may, if desired, connect the other signal lead to ground.

In both of these embodiments, a gas tube is connected across the signal leads instead of an MOV in order to reduce the capacitance and therefore the loss of data signal. If the data frequency components are such that the capacitance of an MOV does not affect the data quality, then MOV's may be substituted for gas tubes in all positions in the circuitry. The MOV has the advantage of being capable of faster response, higher power surge handling, and lower cost relative to gas tubes. However, the capacitance of an MOV is several orders of magnitude higher than a gas tube and in television signal applications this can cause unacceptable losses. However, in telephone line applications the use of an MOV in all positions of the circuit in place of gas tubes may be acceptable.

In many circumstances, the data surge suppression circuitry of the present invention will be employed in combination with a power supply transient voltage surge suppression means by connecting one of the signal conductors of a balanced line or the shield conductor of the coaxial cable to a ground of the power suppression circuit.

DETAILED DESCRIPTION

Figure 2:
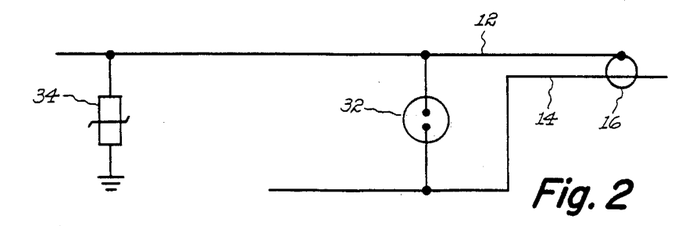
FIG. 2 is a schematic circuit diagram illustrating low-voltage data or signal circuit transient voltage surge protection of the present invention with an unbalanced line, such as a coaxial cable.

FIG. 2 is a schematic circuit diagram of a transient voltage surge suppression circuit of the present invention useful with unbalanced signal lines and is shown in conjunction with a coaxial cable. Referring to FIG. 2 the transient voltage surge suppression circuit or means comprises gas tube 32 connected across shield conductor 12 and signal conductor 14 of coaxial cable 16 with MOV 34 connecting shield conductor 12 to ground. If a surge appears on shield 12, MOV 34 quickly (i.e., 2–5 nanoseconds) clamps the voltage to the ground of the power circuit. An MOV employed for this purpose is selected to be able to handle at least 5,000 amperes. If a surge appears on signal lead 14, gas tube 32 conducts (i.e., 1–10 microseconds) the surge to grounded shield 12. Gas tube 32 will be capable of handling from about 2,000 to 10,000 amperes. A gas tube will not conduct as quickly as a MOV, but it has significantly less capacitance (i.e., 2 as opposed to 2,000 picofarads). If the circuit in FIG. 2 employs a second gas tube instead of a MOV, the surge suppression will be less effective, because the gas tube is slower acting.

Figure 3:
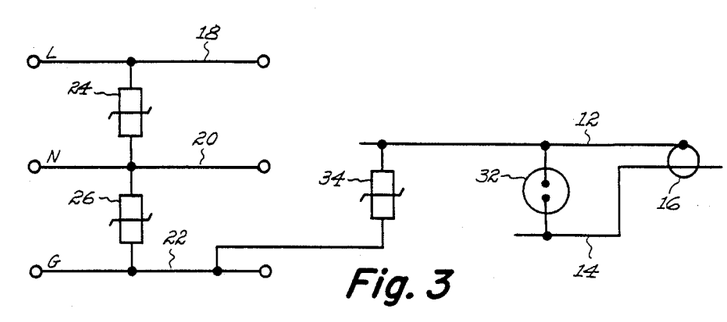
FIG. 3 is a schematic circuit diagram illustrating the circuit arrangement of FIG. 2 in combination with a conventional line voltage or power line transient voltage surge suppression circuit.

FIG. 3 is a schematic circuit diagram of the coaxial cable signal or data line surge protection circuit of FIG. 2 in conjunction with a conventional power line transient voltage surge protection circuit, wherein shield conductor 12 of coaxial cable 16 is connected to its own ground and to power line ground 22 through MOV 34. Those skilled in the art know that the shield conductor of such a coaxial cable is also connected to its own ground (not shown). If a power surge occurs between the neutral and ground conductors 20 and 22 (i.e., 3,500 volts), MOV 26 will clamp it to a level of about 500 volts. By way of an illustrative, but non-limiting example, if a TV set is connected between the power supply and a cable without the cable surge protection circuit and a power surge of about 3,500 volts occurs between the neutral and ground conductors 20 and 22, even though MOV 26 clamps it to a level of about 500 volts with respect to the surge at the power connection, the TV set will still see a surge of about 1,500 volts at the cable connection. This 1,500 volt surge will be induced on the shield of the coaxial cable from the impedance of the power line wiring, because the power ground (and neutral) and the shield of the coaxial cable both ultimately share the same common earth ground. On the other hand, if the coaxial cable is provided with surge protection circuit of the present invention, MOV 34 will reduce or clamp the 1,500 volt surge induced on the cable shield down to a level of no more than about 500 volts. Instead of a TV set being connected between the power supply and coaxial cable, one could have a VCR, home computer, etc. Thus, the present invention in this embodiment will protect such equipment from high voltage surges at both the power connection and the coaxial cable connection. In a particularly preferred embodiment, it is, preferred that the power surge protection circuit, if any, used in conjunction with the cable surge protection circuit of FIG. 3 be the type disclosed and claimed in copending application Ser. No. 942,583 described in greater detail below.

Figure 4A:
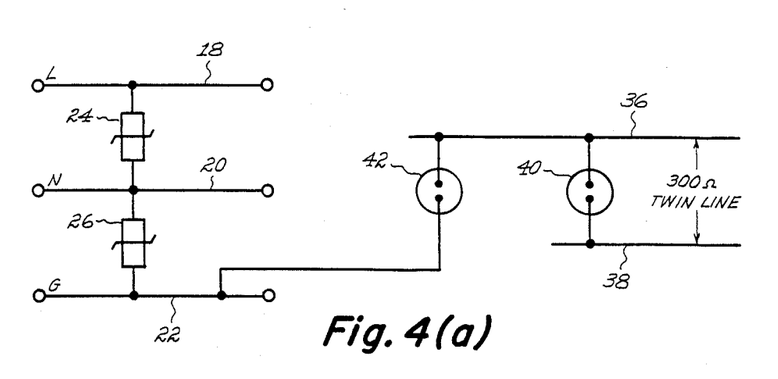
FIG. 4(a) is a schematic circuit diagram illustrating a transient voltage surge suppression circuit of the present invention with a balanced signal line, in combination with a conventional type of power line surge suppression circuit.

FIG. 4(a) is a schematic circuit diagram of an embodiment of a low-voltage signal or data circuit transient voltage surge suppression means of the present invention useful with a balanced, two conductor data signal line, in conjunction with a conventional power line transient voltage surge suppression circuit. Referring to FIG. 4(a), gas tube 40 is connected across signal lines 36 and 38 with gas tube 42 connecting signal line 36 to ground line 22 of the power line surge suppression circuit. If a ground reference static charge is built up on, for example, a TV antenna, the discharge will conduct through line 38 to gas tube 40 or through line 36 to gas tube 42 to power ground 22. Without the antenna line surge protection, the static potential would eventually break down the insulation system in the TV set between the antenna/tuner section to the power section in order to discharge the static electricity. Gas tubes 40 and 42 will be selected to conduct at a voltage of no more than about 500 volts when used in conjunction with a TV set. Gas tube 40 insures that any difference in potential between signal lines 36 and 38 will not exceed about 500 volts in the case of TV set protection. This will greatly help in protecting the signal input circuitry of the TV set. If, for example, in balancing a voltage differential of greater than about 500 volts between 36 and 38, the voltage on line 36 will exceed 500 volts and gas tube 42 will conduct in order to reduce the voltage on line 36 to below 500 volts.

Figure 4B:
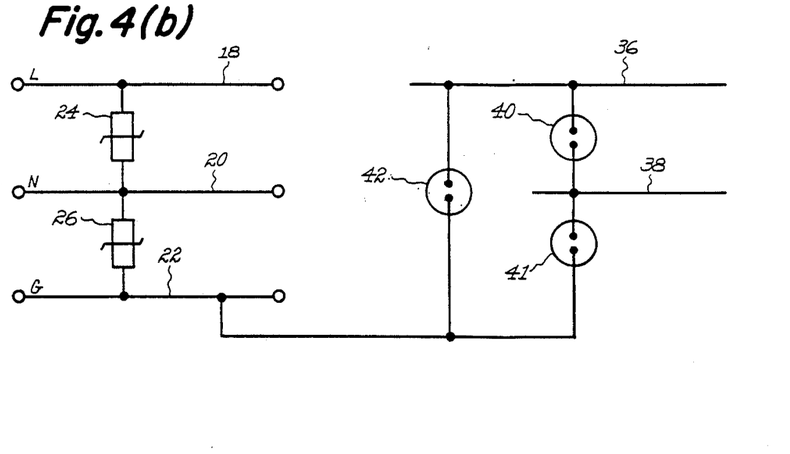
FIG. 4(b) is similar to FIG. 4(a), but with both signal lines connected by gas tubes to the ground of a power line transient voltage surge suppression circuit.

FIG. 4(b) is another embodiment of a surge suppression circuit of the present invention useful with a balanced, two-conductor data signal line in conjunction with a conventional power line transient voltage surge suppression circuit. The data line suppression circuit shown in FIG. 4(b) is similar to that of FIG. 4(a) with the exception of an additional gas tube 41 which connects signal line 38 to power ground line 22, thereby providing a direct path to ground 22 for a surge on line 38. Gas tube 41 provides an alternate path for a power surge applied to signal line 38 to be grounded, without having to go through gas tube 40. It should be noted that with the presence of gas tube 41 in the circuit, gas tube 40 may, in some cases, be regarded as optional. Thus, the use of gas tubes 41 and 42 without the presence of gas tube 40 is also an embodiment of the present invention.

In both FIG. 4(a) and FIG. 4(b), one or more of gas tubes 40, 41 and 42 could be replaced with a MOV. Moreover, in both cases it is preferred that the power surge protection circuit be the type disclosed and claimed in copending application Ser. No. 942,583 described in greater detail below, Thus, FIG. 5(b) schematically illustrates the two gas tube data or signal line suppression circuit shown in FIG. 4(a) in conjunction with the power line voltage surge protection circuit described below and in U.S. Pat. No. 4,739,436, whereas FIG. 5(c) schematically illustrates the three gas tube data line voltage surge suppression circuitry shown in FIG. 4(b) in conjunction with the same power line voltage surge protection circuit.

Figure 5A:
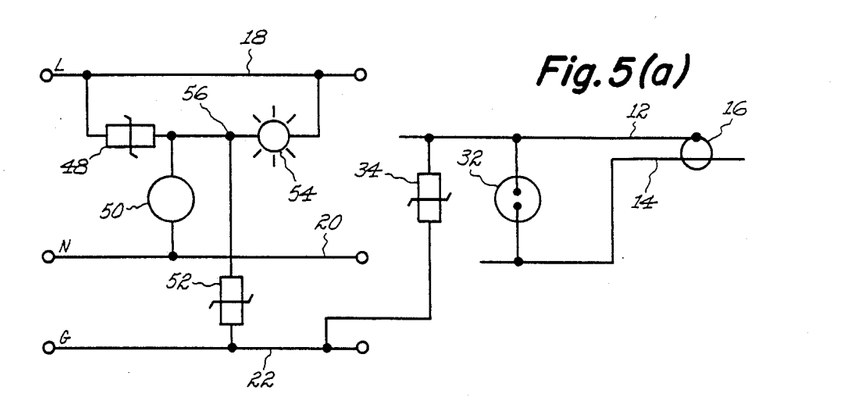
FIG. 5 is a schematic circuit diagram illustrating low-voltage data circuit surge protection circuit arrangements of the present invention in combination with a particularly preferred power line voltage surge suppression circuit.
Figure 5B:
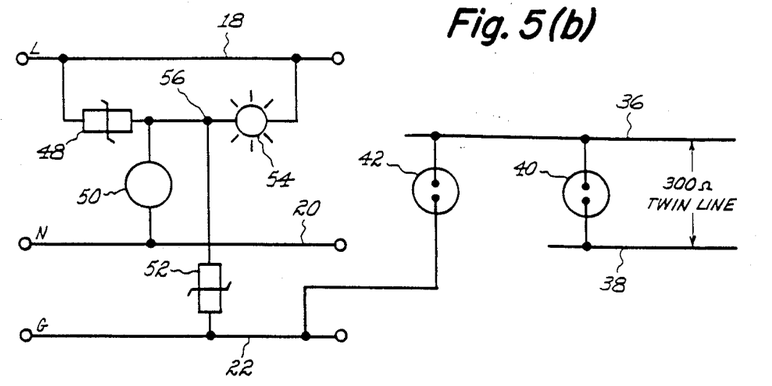
Figure 5C:
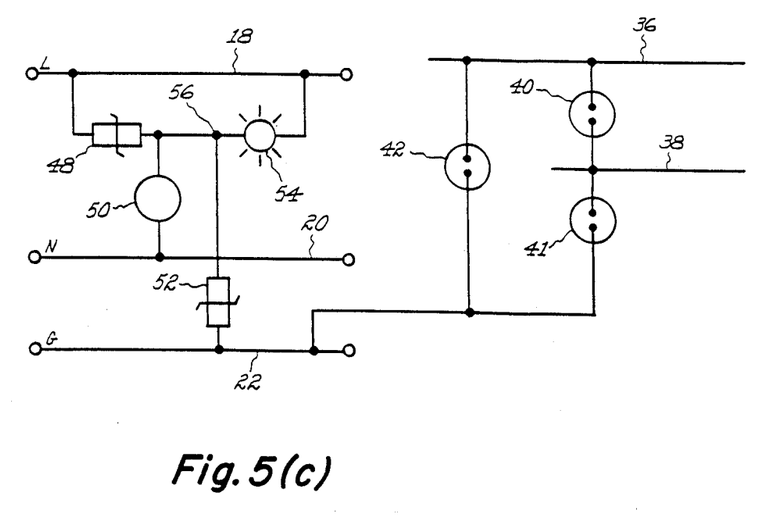

In FIG. 5(a) the unbalanced signal line surge suppression circuit of FIG. 2 is shown in conjunction with a particularly preferred, novel power line transient voltage surge suppression circuit. This novel power supply line surge suppression circuit is disclosed and claimed in U.S. Pat. No. 4,759,436 assigned to the same assignee as the present application. Thus, referring to FIG. 5, low voltage data signal carrying coaxial cable 16 comprising shield conductor 12 and signal conductor 14 is shown having gas tube 32 connected across shield conductor 12 and signal conductor 14, with MOV 34 connecting shield conductor 12 to ground line 22 of the power line voltage surge suppression circuit. In the power line surge suppression circuit, MOV 48 connects line conductor 18 with neutral conductor 20 in series with power interrupter 50. Indicator 54, a preferred, but not an essential component, is connected across junction 56 and line 18. MOV 52 is connected across junction 56 and ground line 22. In this embodiment, the power surge protection circuit can be described as a feed-through current tap providing protection for the system to be protected in the event of a fault between any two of the three conductors. In the United States, a ground connection can be open circuited without the user being aware of the open circuit condition. Moreover, power grounds are often connected to the chassis of the device to be protected. This preferred embodiment prevents the chassis of the device from becoming electrified or hot if and when the MOV or MOV's fail, by eliminating the hot-to-ground MOV.

The power surge protection in the context of the present invention is used in combination with the data line surge protection circuits of the present invention. Under normal operating conditions, line power and data signals flow through the conductors unimpeded. In the case of a surge across line to neutral, MOV 48 conducts and clamps the surge to a safe level. When the surge comes from neutral to ground, MOV 52 conducts clamping that surge to a safe level. In the case of a surge across line to ground, MOV 48 conducts and then MOV 52 conducts. When a surge occurs between the center conductor 14 of the data cable and shield 12, gas tube 32 conducts. When surge occurs between shield 12 and power system ground 22, MOV 34 clamps that surge to a safe level.

If one considers the case where a ground referenced surge between the center conductor of the coaxial line and the shield is some distance to the surge suppression circuitry, a voltage drop is incurred along the length of the cable such that approximately one half of the surge voltage is remnant at the shield connection of the gas tube in the surge suppressor, when referenced to earth ground. This remnant voltage is clamped by MOV 34 to a safe level. This increase of antenna ground relative to earth ground is called "ground rise". Similarly, when a surge occurs on the power line from either line to ground or neutral to ground, ground rise occurs, causing a voltage on the local power line ground connection at the surge suppressor of as much as one half of the surge voltage. In that case, MOV 34 conducts, bringing the voltage between the cable shield and power ground conductor to a safe level. Gas tube 32 will conduct only if the voltage differential between the shield and the central conductor exceeds the gas tube conducting voltage, which may occur under heavy surge conditions. As set forth above, in the case of signal line surge protection for a VCR or a TV set, this voltage will ordinarily be below about 500 volts.

With respect to the operation of the preferred power line surge protection circuit, under normal operating conditions current passes unimpeded through the device or circuit being fed from the source receptacle In the event that a surge should occur, the following surge current paths are provided. In the case of a surge from line to neutral, the power surge is diverted by MOV 48 to power interrupter 50 to neutral 20 shorting out the power surge. During normal operation, power for indicator 54 flows from line conductor 18 through power interrupter 50 to neutral conductor 20. When power interrupter 50 cuts off (indicating MOV failure), the power to indicator 54 is reduced causing the indicator to be turned off, thereby indicating to the user that the MOV has failed. This circuit configuration uses only two MOV's and only one power interrupter to provide complete protection against all line power surge modes. Indicator 54, while not essential to surge suppression, serves to alert the user of any failure of either MOV. Further, in this circuit configuration only one MOV (48) is under continuous voltage stress, thereby extending the life of the product and enhancing product safety.

A known characteristic of MOV's is the gradual increase of leakage current after exposure to a large number of surges that have less than the specification limit. The leakage current, or standby current of the MOV initially is very low (i.e., typically less than 100 microamperes drawn from a 120 VAC line), but over time, exposure to low power surges deteriorates the MOV, allowing the standby current to increase significantly over a period of time. In the case of the MOV's used in the present invention, when the standby current exceeds about a 25 milliampere peak, the MOV rapidly degenerates to thermal runaway with attendant rapid burning. This failure mechanism is not sensed by a fuse, because the low current does not provide an $I^2t$ level capable of blowing the fuse. If a size of fuse were selected such that normal standby current would produce the $I^2t$ level sufficient to cause opening of the fuse, the MOV would be prevented from providing the surge suppression required. Furthermore, the leakage current through a MOV can be a hazard if the leakage is from line to ground and the user has a faulty or open ground connection, allowing the leakage to raise the protected appliance's enclosure potential to line voltage.

A particularly preferred embodiment of the power line voltage surge suppression circuit useful with the data line voltage surge suppression circuits of the present invention employs a temperature sensitive switch as the power interrupter 50 connected as shown in the circuit of FIG. 5. Under normal operation and under surge conditions less than MOV specification, the current flows are identical to a fused circuit operation. However, in the case where a surge of greater than the MOV specification occurs, the thermal cut-off, TCO, 50 still allows the surge to be clamped by the MOV. TCO 50 senses MOV temperature and interrupts power if the sensed temperature exceeds a predetermined level. The rise in MOV temperature is an indication that the standby current is beyond normal limits, and the MOV should be removed from the power circuit. If a surge occurs which is in excess of the MOV power handling capability specification but within the capacity of MOV 30 to handle without it without MOV failure due to MOV materials or construction, the TCO 50 allows the MOV 48 to absorb the power up to the point at which its temperature exceeds the activation temperature of the thermal cut out. Thus the use of a thermal cut-out allows a more complete protection against surges by not limiting the surge power absorbed by the MOV, but instead allowing the MOV temperature to determine power interruption. In the case where a large energy surge is absorbed by the MOV in excess of its inherent power handling capability, the MOV will heat up to the point that the TCO opens, which removes power from the MOV. In the case where a MOV has aged under constant voltage stress or has absorbed a sufficient number of surges to cause its standby current to increase, its steady state power dissipation increases causing a temperature rise in the MOV. The temperature rise, which occurs before the MOV actually flames or smokes, is sensed by the TCO 50 which interrupts power from the MOV preventing the MOV from reaching a temperature sufficient to cause smoke or flame.

Figure 6:
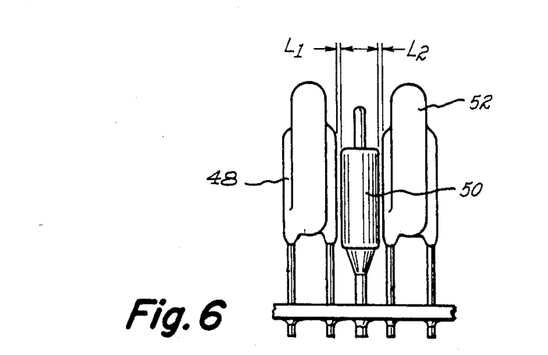
FIG. 6 is a schematic plan view of a physical arrangement of the circuit components of a power line voltage transient voltage surge suppression circuit useful in conjunction with a data or signal line surge suppression means of the present invention.

It should be noted that the physical arrangement of the MOV's relative to the thermal cut-off is of significance to the proper operation of this invention The body of the two MOV's must be within 0.03 inches of the surface of the TCO device in order for the TCO to operate properly. The surfaces of the two MOV's 48 and 52 need not be parallel to each other as shown in FIG. 6, so long as the spacing, L1 and L2, of the surface of each MOV is within 0.03 inches of the TCO 50. The pancake construction of metal oxide varistor having one electrode on each side of the relatively thin disc also adds a constraint to the mechanical placement of the MOV's. The thermal cut off is electrically uninsulated so that for proper operation the sides of the MOV's placed in close proximity with the thermal cut off device must be connected to the same electrical potential as the thermal cut off body to prevent accidental shorting when the MOV fails. For example, those terminals (not shown) of MOV 48 and MOV 52 which are connected by TCO 50 are also adjacent TCO 50 so that the surfaces of the respective MOVs are at the same potential as the TCO.

The use of the thermal cut out device for the power interrupter function allows power to be removed from the MOV under conditions where the temperature of the MOV has risen although the standby current of the MOV has increased to less than 10 milliamperes, yet the TCO is capable of passing current from surges in excess of 5,000 amperes to the MOV for suppression without interrupting the power. Thus, the MOV and TCO arrangement gives the most complete surge suppressing capability.

The connection of two varistors in series and connected to a power interrupting device as shown in FIG. 5 provides significant performance and safety advantages when compared with either single MOV or triple MOV devices. When compared to a single MOV device, the invention additionally protects against the common mode surges, using the following paths: surges from line to ground are suppressed by the series combination of MOV 48 and MOV 52, and surges from neutral to ground are suppressed by the series combination of power interrupter 50 and MOV 52. When compared to a triple MOV device the invention features a longer product life and a greater margin of safety. This is because product life is primarily determined by the MOV's life under continuous voltage stress. In prior art triple MOV voltage surge suppressors having a first MOV connecting line to neutral, a second MOV connecting neutral to ground and a third MOV connecting line to ground, the two MOV's which are connected from line to neutral and line to ground, respectively, are both under constant voltage stress. When either of these two MOV's reaches the point at which its resistance declines sufficiently to cause current to rise to the point of heating the MOV, the circuit fails. Therefore, the device life is limited by the shorter life of two stressed MOVs. In a triple MOV device a line to ground MOV failure can cause a significant safety hazard, because the line voltage will be shorted directly to ground. The preferred power line voltage surge protection circuit of the present invention has no comparable failure mechanisms.

In the present invention only MOV 48 connected from line to neutral through TCO 50 is under constant voltage stress. Thus, only one MOV is under continuous voltage stress, and only that one MOV limits the life of the surge suppression device. Consequently, the life of the total surge suppression device is longer than that of a comparable two or three MOV device in which more than one MOV is continuously stressed. The impedance of indicator light 54 which will generally be a LED is sufficiently high to prevent MOV 52 from being under stress. If no indicator light is used, than that part of the circuit is completely open. In the case where a power supply receptacle has a faulty ground, that is, either a high resistance ground or a disconnected ground, no single point failure of a component of the circuit of the present invention can cause a safety hazard. In the case where a power supplying receptacle is reverse wired, that is line and neutral conductors are interchanged, low levels of ground current leakage caused by an MOV nearing end of life will be sensed by the TCO to remove power and prevent any further ground current from occurring.

The preferred line voltage surge suppression circuit of the present invention is applicable to many types of three-wire electrical power supply systems. The component values and sizes will be selected based on the voltage of the power supply system and the internal protection of appliances connected to the power supply. For example, certain television receivers include a surge suppression device within the appliance itself. The components of an external surge suppression circuit of the present invention would preferably be selected to clamp any surge voltage at a level below the clamping level of the appliance's built-in surge suppression device, to avoid the loss of the appliance caused by circuit interruption of the internal surge suppressor. For example, many internal surge suppressors clamp voltage surges at about 600 to 800 volts. Therefore, the external circuit would be selected to clamp the voltage at no greater than 600 volts. Many devices have no internal surge suppressor, and in those case the external suppression would be designed to clamp surges at a voltage level, typically 1,000 volts or less, low enough to prevent internal damage to the electrical device. The present invention allows ease of design, because only a few components are required and those component values can be selected for the particular circuit protection required.

What is claimed is:

1. A voltage surge suppression circuit for protecting a low voltage signal circuit which receives data or signals from a coaxial cable which comprises a signal conductor and a ground shield conductor, said circuit comprising a gas tube connected across the signal and shield conductors of the cable and an MOV connecting the shield conductor of the cable to a ground.

2. The circuit of claim 1 wherein said MOV connects said shield conductor to a ground line of a power line voltage surge suppression means.

3. The coaxial cable surge suppression circuit of claim 2 wherein said power line voltage suppression means includes a line conductor, a neutral conductor and a ground conductor, along with a line voltage surge suppression circuit comprising:

a first metal oxide varistor having a first terminal connected to said line conductor and a second terminal;

a power interrupter comprising a temperature sensitive power cut off switch which is normally closed and which opens when the temperature of said switch is raised to a predetermined level for interrupting current therethrough when said current exceeds a predetermined limit, said interrupter having a first terminal connected to said second terminal of said first metal oxide varistor and a second terminal of said power interrupter connected to said neutral conductor, and a second metal oxide varistor having a first terminal connected to said second terminal of said first metal oxide varistor and a second terminal of said second metal oxide varistor connected to said ground conductor.

4. The invention of claim 3 wherein said temperature of said power interrupter is raised to said predetermined level by heat transfer from either of said metal oxide varistors.

5. The invention of claim 4 wherein said power cut off switch is in heat exchange relationship with both of said metal oxide varistors.

6. The invention of claim 5 wherein said first metal oxide varistor is disposed adjacent said cut-off switch such that the surface of said first metal oxide varistor adjacent the outer surface of said cut-off switch is spaced from said outer surface of said power cut-off switch a distance of not greater than 0.03 inch.

7. The invention of claim 6 wherein said second metal oxide varistor is disposed adjacent said cut-off switch such that the surface of said second metal oxide varistor adjacent the outer surface of said cut-off switch is spaced a distance of not greater than 0.03 inch from said outer surface of said cut-off switch.

8. The invention of claim 7 having indicator means for indicating the condition of said first and second metal oxide varistors, said indicator means having a first terminal connected to the junction of said second terminal of said first metal oxide varistor and said first terminal of said second metal oxide varistor and a second terminal of said indicator means connected to said line conductor.

9. A voltage surge suppression circuit for a low-voltage coaxial cable comprising a signal conductor and a ground shield conductor, said circuit comprising a gas tube connected across the signal and shield conductors and an MOV connecting the shield conductor to a ground.

10. The circuit of claim 9 wherein said MOV connects said shield conductor to a ground line of a power line voltage surge suppression means.

11. The coaxial cable surge suppression circuit of claim 10 wherein said power line voltage surge suppression means includes a line conductor, a neutral conductor and a ground conductor along with a line voltage surge suppression circuit comprising:

(i) a first metal oxide varistor having a first and second terminal, said first terminal connected to said line conductor;

(ii) a second metal oxide varistor having a first and second terminal, wherein said first terminal thereof is connected to said second terminal of said first metal oxide varistor and wherein said second terminal is connected to said ground conductor, and (iii) a temperature sensitive power cut-off switch for interrupting current through said surge suppression circuit when said current exceeds a predetermined level, said switch having a first terminal connected to said second terminal of said first metal oxide varistor and a second terminal connected to said neutral conductor, said switch being normally closed and which opens when the temperature of said switch is raised to a predetermined level by heat transfer from either of said metal oxide varistors which heat up when the current therethrough exceeds said predetermined level.

12. The circuit of claim 11 wherein said power cut-off switch is in heat exchange relationship with both of said metal oxide varistors of said power line voltage surge suppression circuit.

13. The circuit of claim 12 wherein both of said metal oxide varistors of said line voltage surge suppression circuit are disposed adjacent said power cut-off switch such that the surface of said varistors adjacent the outer surface of said switch is spaced apart therefrom at a distance not exceeding 0.03 inches.

14. The circuit of claim 13 wherein said line voltage surge suppression circuit further contains indicator means for indicating the condition of said first and second metal oxide varistors, said indicator means having a first and a second terminal, wherein said first terminal is connected to the junction of said second terminal of said first metal oxide varistor and said first terminal of said second metal oxide varistor and wherein said second terminal of said indicator means is connected to said line conductor.

15. A voltage surge suppression circuit for a two conductor, low-voltage balanced signal line, said circuit comprising a firs gas tube connected across both of said conductors and a second gas tube connecting one of said conductors to a ground line of a power line voltage surge suppression means, wherein said power line voltage surge suppression means includes a line conductor, a neutral conductor and a ground conductor along with a power line voltage surge suppression circuit comprising:

(i) a first metal oxide varistor having a first and second terminal, said first terminal connected to said line conductor;

(ii) a second metal oxide varistor having a first and second terminal, wherein said first terminal thereof is connected to said second terminal of said first metal oxide varistor and wherein said second terminal is connected to said ground conductor, and (iii) a temperature sensitive power cut-off switch for interrupting current through said surge suppression circuit when said current exceeds a predetermined level, said switch having a first terminal connected to said second terminal of said first metal oxide varistor and a second terminal connected to said neutral conductor, said switch being normally closed and which opens when the temperature of said switch is raised to a predetermined level by heat transfer from either of said metal oxide varistors which heat up when the current therethrough exceeds said predetermined level.

16. The circuit of claim 15 wherein said power cut-off switch is in heat exchange relationship with both of said metal oxide varistors of said power line voltage surge suppression circuit.

17. The circuit of claim 16 wherein both of said metal oxide varistors of said line voltage surge suppression circuit are disposed adjacent said power cut-off switch such that the surface of said varistors adjacent the outer surface of said switch is spaced apart therefrom at a distance not exceeding 0.03 inches.

18. The circuit of claim 17 wherein said line voltage surge suppression circuit further contains indicator means for indicating the condition of said first and second metal oxide varistors, said indicator means having a first and a second terminal, wherein said first terminal is connected to the junction of said second terminal of said first metal oxide varistor and said first terminal of said second metal oxide varistor and wherein said second terminal of said indicator means is connected to said line conductor.

19. A voltage surge suppression circuit for a two conductor, low-voltage balanced signal line, said circuit comprising a first gas tube connected across both of said conductors, a second gas tube connecting one of said conductors to a ground and a third gas tube connecting the other end of said conductors to a ground, wherein said ground is a ground line of a power line voltage surge suppression means and wherein said power line voltage surge suppression means includes a line conductor, a neutral conductor and a ground conductor along with a power line voltage surge suppression circuit comprising:

(i) a first metal oxide varistor having a first and second terminal, said first terminal connected to said line conductor;

(ii) a second metal oxide varistor having a first and second terminal, wherein said first terminal thereof is connected to said second terminal of said first metal oxide varistor and wherein said second terminal is connected to said ground conductor, and (iii) a temperature sensitive power cut-off switch for interrupting current through said surge suppression circuit when said current exceeds a predetermined level, said switch having a first terminal connected to said second terminal of said first metal oxide varistor and a second terminal connected to said neutral conductor, said switch being normally closed and which opens when the temperature of said switch is raised to a predetermined level by heat transfer from either of said metal oxide varistors which heat up when the current therethrough exceeds said predetermined level.

* * * * *